United States Patent
Hawkins et al.

(10) Patent No.: US 12,147,799 B2
(45) Date of Patent: Nov. 19, 2024

(54) CONCURRENT CODE UPGRADE

(71) Applicant: International Business Machines Corporation, Armonk, NY (US)

(72) Inventors: Warren Hawkins, Winchester (GB); Nicholas Michael O'Rourke, Southampton (GB); Dominic Tomkins, Alton (GB); Timothy Andrew Moran, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 18/116,780

(22) Filed: Mar. 2, 2023

(65) Prior Publication Data
US 2024/0296037 A1    Sep. 5, 2024

(51) Int. Cl.
| | |
|---|---|
| G06F 8/65 | (2018.01) |
| G06F 9/445 | (2018.01) |
| G06F 9/455 | (2018.01) |
| G06F 11/00 | (2006.01) |
| G06F 11/10 | (2006.01) |

(52) U.S. Cl.
CPC ..................................... G06F 8/65 (2013.01)

(58) Field of Classification Search
CPC .... G06F 8/65; G06F 11/1456; G06F 11/2064; G06F 11/2058; G06F 11/1458; H04L 67/1076; H04L 67/1095; H04L 69/40; H04L 67/1097
See application file for complete search history.

(56) References Cited

U.S. PATENT DOCUMENTS

| | | |
|---|---|---|
| 10,567,500 B1 * | 2/2020 | Leshinsky ........... H04L 67/1097 |
| 10,852,946 B1 | 12/2020 | Ozmen et al. |
| 2017/0031602 A1 | 2/2017 | Xu et al. |
| 2019/0235959 A1 | 8/2019 | Ainscow et al. |
| 2021/0349705 A1 | 11/2021 | Sasson et al. |

OTHER PUBLICATIONS

Anonymous, "A method for managing critical resources for IO connections in a storage controller," IP.com Prior Art Database, Technical Disclosure No. IPCOM000254879D, Aug. 9, 2018, 3 pages.

* cited by examiner

Primary Examiner — Thuy Dao
(74) Attorney, Agent, or Firm — Zilka-Kotab, P.C.

(57) ABSTRACT

A method comprises: installing the target software version on a first node of the storage appliance; restarting the first node of the storage appliance while also running the current software version on other nodes of the storage system; subsequent to said installing the target software version and said restarting of the first node, determining if all hosts of the storage system have discovered paths to volumes on the first node; responsive to determining that all hosts of the storage system have discovered paths to volumes on the first node, permitting the CCU of the nodes to continue to upgrade one of the other nodes of the storage system from the current software version to the target software version; and responsive to determining that not all hosts of the storage system have discovered paths to volumes on the first node, preventing the CCU of the nodes from continuing.

18 Claims, 4 Drawing Sheets

CONCURRENT CODE UPGRADE

BACKGROUND

The technical character of the present invention generally relates to the field of data storage, and more particularly, to updating/upgrading software running on multiple nodes in a storage controller.

Concurrent code upgrade (CCU) is a process that allows for the simultaneous update of the software running on multiple nodes in a storage controller. This is important because it allows for the continued operation of the storage system during the update process, without any downtime or interruption of service.

During CCU of a multi-node storage controller, individual nodes upgrade independently and sequentially. During the upgrade of an individual node, that node is taken offline, a new software level applied, and the node brought back online. The upgrade process co-ordinates each node upgrade to ensure that redundant paths to volumes are always available by ensuring that only one node is offline at a time and that, after upgrade, sufficient time is allowed for hosts to rediscover paths to volumes on that node. A host requires this time to discover volumes (by issuing SCSI commands such as REPORT LUNS and INQUIRY) so that it can begin sending I/O to these volumes (SCSI commands such as READ and WRITE).

In some cases, a host may log in to a newly upgraded node but fail to discover volumes on that node. For instance, it may attempt discovery too early (before volume mappings are available), or there may be a delay in ports becoming available. Either of these situations can result in the host not seeing responses to its discovery commands in a timely manner, and the host will then time out paths to volumes on the newly upgraded node. In this situation, even though that host is logged in to the newly upgraded node, it cannot access volumes through that node. When the upgrade process allows the other node to go down for upgrade, the host loses access to its volumes.

SUMMARY

The present invention seeks to provide a method CCU of nodes of a multi-node storage system to upgrade the nodes from a current software version to a target software version. Such a method may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor. The present invention yet further seeks to provide a system for CCU of nodes of a multi-node storage system to upgrade the nodes from a current software version to a target software version.

According to an aspect of the present invention there is provided a computer-implemented method for concurrent code upgrade, CCU, of nodes of a multi-node storage system to upgrade the nodes from a current software version to a target software version. The method comprises: installing the target software version on a first node of the storage appliance; restarting the first node of the storage appliance while also running the current software version on other nodes of the storage system; subsequent to said installing the target software version and said restarting of the first node, determining if all hosts of the storage system have discovered paths to volumes on the first node; responsive to determining that all hosts of the storage system have discovered paths to volumes on the first node, permitting the CCU of the nodes to continue to upgrade one of the other nodes of the storage system from the current software version to the target software version; and responsive to determining that not all hosts of the storage system have discovered paths to volumes on the first node: preventing the CCU of the nodes from continuing.

Thus, there may be provided an approach to determining whether all hosts have successfully discovered paths to volumes on a recently upgraded node. In the case that they have, the proposed approach allows the upgrade to proceed immediately, thus avoiding any unnecessary delay (e.g. a fixed time period that is typically implemented in conventional approaches to cover worst case assumptions about host behavior). In the case that they have not successfully discovered paths to volumes on a recently upgraded node, the upgrade is prevented from proceeding.

Put another way, the invention seeks to provide one or more concepts for preventing hosts from losing access to their volumes during upgrade, e.g. by using the node that has not yet been upgraded to prompt rediscovery of paths on an upgraded node in the case that they have not been successfully discovered by a host. Proposed embodiments may thus accelerate CCU by allowing a next node to upgrade immediately after all hosts have successfully discovered paths through its partner node, e.g. without requiring a traditional/conventional fixed delay, such as 30-minutes.

It is proposed to implement an approach of active detection that a host can successfully access volumes on a newly upgraded node.

In addition, embodiments of the present invention provide concepts for a computer program product for CCU of nodes of a multi-node storage system to upgrade the nodes from a current software version to a target software version, the method comprising: installing the target software version on a first node of the storage appliance; restarting the first node of the storage appliance while also running the current software version on other nodes of the storage system; subsequent to said installing the target software version and said restarting of the first node, determining if all hosts of the storage system have discovered paths to volumes on the first node; responsive to determining that all hosts of the storage system have discovered paths to volumes on the first node, permitting the CCU of the nodes to continue to upgrade one of the other nodes of the storage system from the current software version to the target software version; and responsive to determining that not all hosts of the storage system have discovered paths to volumes on the first node: preventing the CCU of the nodes from continuing.

Embodiments may be employed in combination with conventional/existing multi-node storage systems. In this way, embodiments may integrate into legacy systems so as to improve and/or extend their functionality and capabilities. An improved multi-node storage system may therefore be provided by proposed embodiments.

According to another aspect, there is provided a system for CCU of nodes of a multi-node storage system to upgrade the nodes from a current software version to a target software version. The system comprises: one or more processors; and a memory comprising code stored thereon that, when executed, performs a method for concurrent code upgrade, CCU, of nodes of a multi-node storage system to upgrade the nodes from a current software version to a target software version, the method comprising: installing the target software version on a first node of the storage appliance; restarting the first node of the storage appliance while also running the current software version on other nodes of the storage system; subsequent to said installing the target software version and said restarting of the first node, determining if all hosts of the storage system have discovered paths to volumes on the first node; responsive to determining that all hosts of the storage system have discovered paths to volumes on the first node, permitting the CCU of the nodes to continue to upgrade one of the other nodes of the storage system from the current software version to the target software version; and responsive to determining that not all hosts of the storage system have discovered paths to volumes on the first node: preventing the CCU of the nodes from continuing.

Thus, there may be proposed concepts for CCU of nodes of a multi-node storage system, wherein the concepts provide one or more approaches to determining that hosts are well connected to a node in a storage controller (e.g. The host has logins from all of its wwpns, through multiple ports on the storage controller, and has issued a Report LUNS command and has issued Inquiries to every volume mapped to that host).

DETAILED DESCRIPTION

Figure 1:
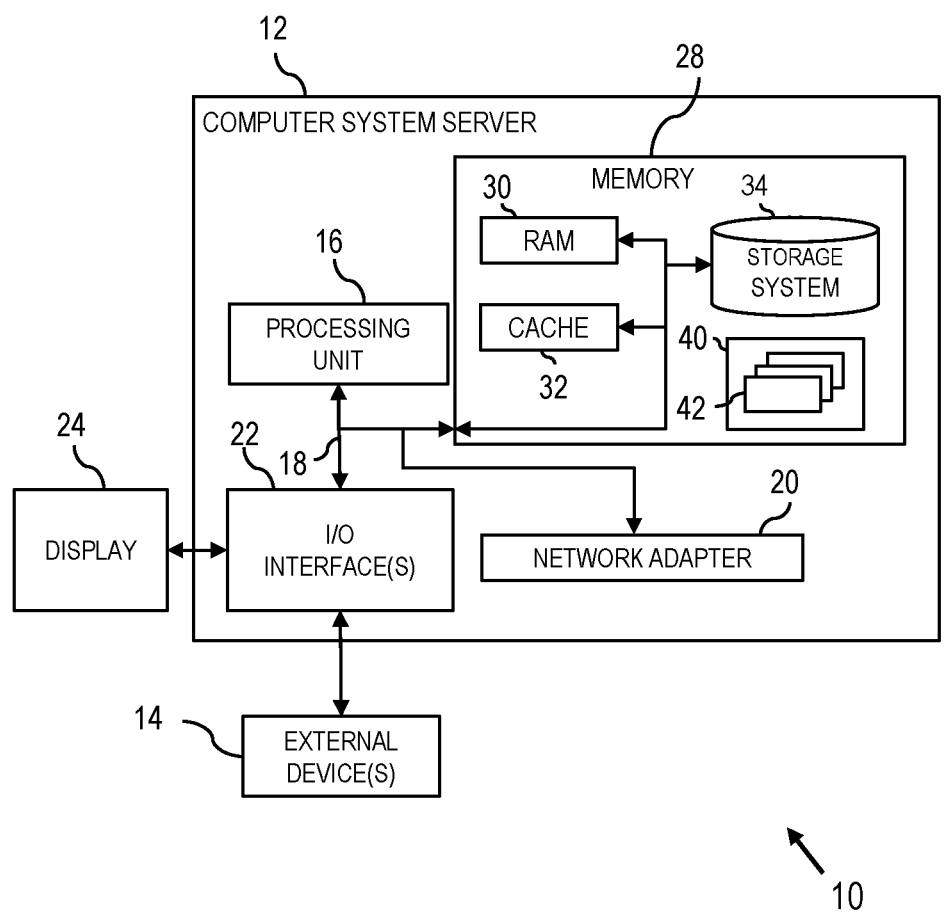
FIG. 1 depicts a computing node according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates the field of data storage, and more particularly, to concepts for updating/upgrading software running on multiple nodes in a storage controller. More specifically, embodiments of the present invention provide concepts for concurrent code upgrade, CCU, of nodes of a multi-node storage system to upgrade the nodes from a current software version to a target software version.

A method according to the proposed concept comprises: installing the target software version on a first node of the storage appliance; restarting the first node of the storage appliance while also running the current software version on other nodes of the storage system; subsequent to said installing the target software version and said restarting of the first node, determining if all hosts of the storage system have discovered paths to volumes on the first node; responsive to determining that all hosts of the storage system have discovered paths to volumes on the first node, permitting the CCU of the nodes to continue to upgrade one of the other nodes of the storage system from the current software version to the target software version; and responsive to determining that not all hosts of the storage system have discovered paths to volumes on the first node, preventing the CCU of the nodes from continuing.

Thus, there is proposed a concept of active detection/monitoring that may prompt rediscovery of paths on an upgraded node. In the case that paths on the upgraded node are still not being used even after this prompt, the CCU process may be stalled so that the host does not lose access to its volumes.

The proposed concept(s) may also provide a method to determine that hosts will lose access to volumes if an upgrade is allowed to proceed.

Embodiments may thus support a CCU update process that will allow a node to immediately upgrade (without further time delay) if every host on its partner node is well connected.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client can be implemented as one or more of the program modules 42. Additionally, the DHCP client may be implemented as separate dedicated processors or a single or several processors to provide the functionality described herein. In embodiments, the DHCP client performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
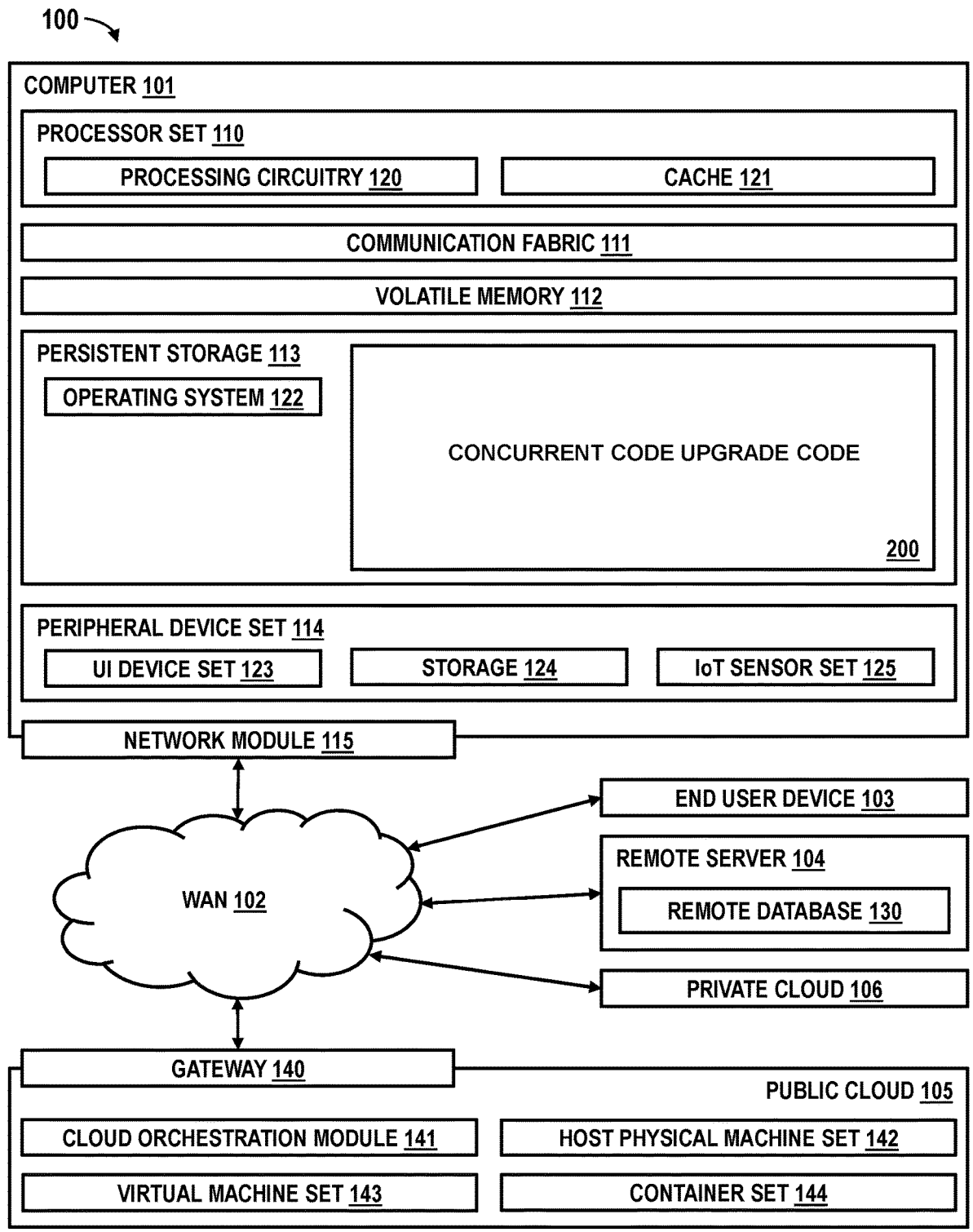
FIG. 2 depicts an illustrative computing environment according to embodiments of the present invention.

Referring now to FIG. 2, an illustrative computing environment 100 is depicted. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a proposed method for CCU 200 of nodes of a multi-node storage system. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 3:
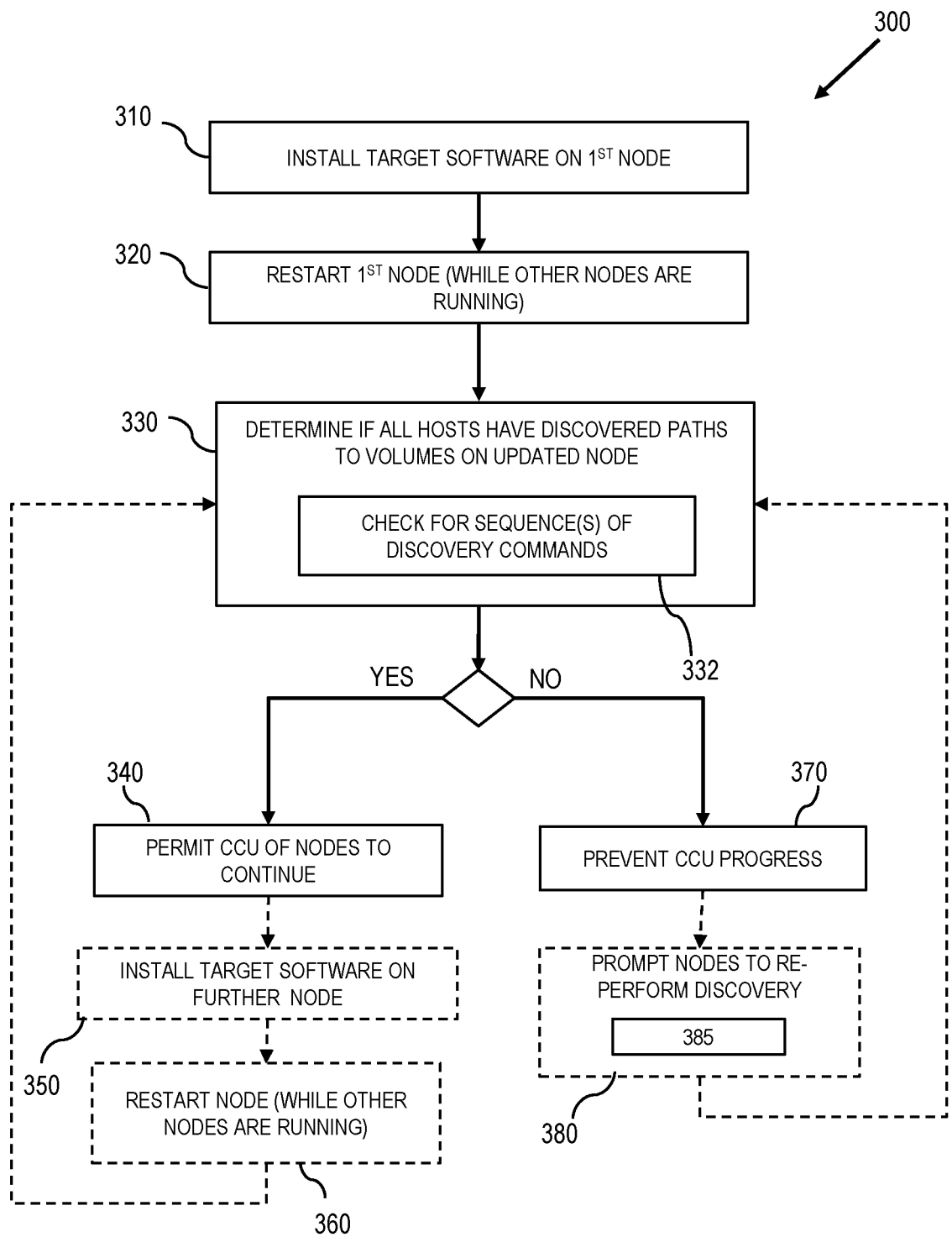
FIG. 3 illustrates a method for CCU of nodes of a multi-node storage according to an aspect of the invention.

Referring now to FIG. 3, there is depicted a flow diagram of a computer-implemented method 300 according to an embodiment. The method is for CCU of nodes of a multinode storage system to upgrade the nodes from a current software version to a target software version. In this example, the storage system provides virtualized storage to a plurality of hosts, and the storage system virtualizes storage of a plurality of data storage systems.

The method begins with the step 310 of installing the target software version on a first node of the storage appliance. Next, in step 320, the first node of the storage appliance is restarted while also running the current software version on other nodes of the storage system.

Subsequent to said installing 310 the target software version and said restarting 320 of the first node, the method proceeds to step 330 which comprises determining if all hosts of the storage system have discovered paths to volumes on the first node. Here, the step 330 of determining if all hosts of the storage system have discovered paths to volumes on the first node comprises the sub-step 332 of checking for a predetermined sequence of discovery commands to determine if a host has discovered paths to volumes on the first node. Specifically, step 332 is configured to check for an expected sequence of discovery commands (e.g. REPORT LUNS and various INQUIRY commands) to determine that a host is aware of the newly available paths.

If it is determined (in step 330) all hosts of the storage system have discovered paths to volumes on the first node, the method proceeds to step 340 of permitting the CCU of the nodes to continue to upgrade one of the other nodes of the storage system from the current software version to the target software version. By way of example, this leads to steps 350 and 360 being undertaken: step 350—installing the target software version on a second node of the storage system; and step 360—restarting the second node of the storage appliance while also running the current software version on other nodes of the storage system. The method then returns back to step 330 to repeat the determination in view of the next node (i.e. second node) being updated.

If it is determined (in step 330) that not all hosts of the storage system have discovered paths to volumes on the first node, the method proceeds to step 370 in which the CCU of the nodes is prevented from continuing. As indicated by the dashed boxes in FIG. 3, following such prevention, the method may prompt (in step 380) hosts of the storage system to re-perform discovery of paths to volumes on the first node. By way of example, step 380 of prompting comprises sub-step 385 of controlling a second node of the storage system to prompt hosts of the storage system to re-perform discovery of paths to volumes on the first node, wherein the second node is one of other nodes of the storage system. For example, prompting comprises raising a unit attention for the hosts, and optionally wherein the unit attention comprises an Asymmetric Access State Changed or a LUN Inventory Changed unit attention. The method then returns back to step 330 to repeat the determination as to whether the hosts have discovered the paths to volumes on the first node.

Figure 4:
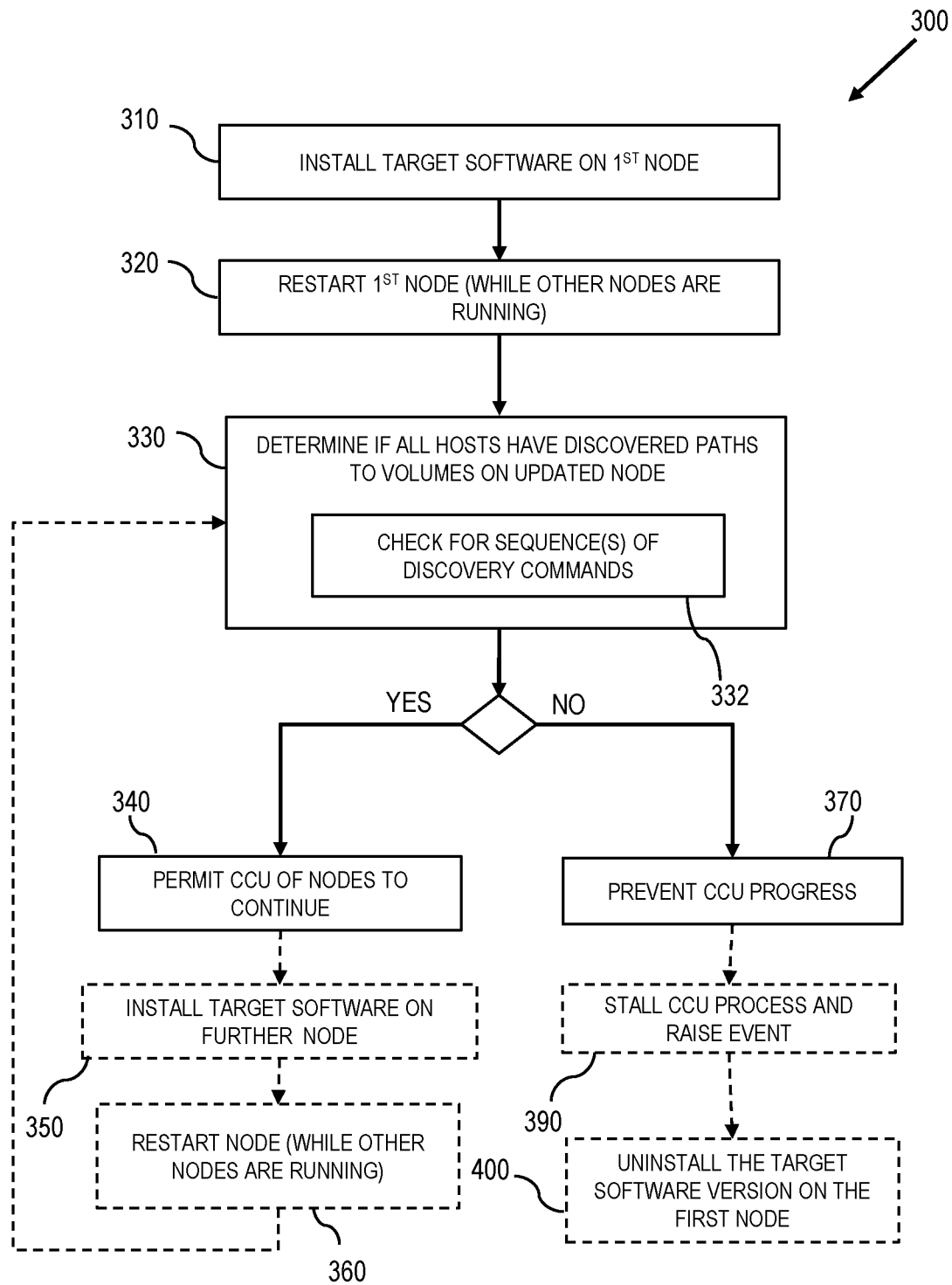
FIG. 4 depicts an exemplary modification to the method of FIG. 3

Referring now to FIG. 4, there is depicted an alternative implementation of the method 300 described above with reference to FIG. 3. Specifically, the illustration of FIG. 4 shows a modification to the method 300 wherein responsive to determining that not all hosts of the storage system have discovered paths to volumes on the first node, the CCU is stalled and an event is raised.

That is, after step 370 of preventing the CCU process from progressing, the method proceeds to step 390. In step 390, the CCU process is stalled and an event is raised to indicate a problem with the CCU.

In addition, as indicated by the lowermost dashed box in FIG. 4, the method may also proceed to step 400 of uninstalling the target software version on the first node of the storage appliance to revert the first node back to the current software version.

By way of summary, the methods illustrated in FIGS. 3 and 4 provide for active detection that a host can successfully access volumes on a newly upgraded node. In the case that they have, the methods permit the upgrade to proceed immediately, thus avoiding unnecessary delay.

Purely by way of further explanation, an exemplary method according to a proposed embodiment may use SCSI behavior of all hosts connected to an upgraded node to allow upgrade of a partner node to proceed only in the case that doing so is not expected to impact host I/O. In the case that good connectivity is discovered, allow upgrade to proceed without unnecessary delay. An example flow of such a method may be summarized as follows:

CCU begins. Node 2 goes down for upgrade, and returns. Hosts log in to Node 2.

Node 2 assesses each host. When a pattern of SCSI commands (e.g., Report LUNS and an Inquiry sent to each volume mapped to that host) is observed, the host is flagged as having good connectivity to Node 2.

In the case that all hosts are assessed as having good connectivity to Node 2, the CCU process indicates that Node 1 is ready for upgrade.

A sampling interval passes. This could be a short period of time, or could be the period between Node 2 returning, and the CCU process indicating that Node 1 is ready to go down for upgrade. If any hosts are assessed as not having good connectivity to Node 2, Node 2 notifies the CCU process that some hosts have not performed good discovery.

Node 2 communicates with node 1 in order to query whether the host is flagged as having good connectivity to node 1.

The CCU process prompts node 1 to prompt those hosts that have not performed good discovery to re-perform discovery. For example, node 1 could raise an Asymmetric Access State Changed or a LUN Inventory Changed unit attention for those hosts.

Those hosts will attempt rediscovery—e.g., re-issuing Report LUNS down available paths.

Node 2 re-evaluates the connectivity status of the host.

In the event that node 2 still does not have good connectivity, node 1 is prevented from upgrading (as doing so would result in a host loss of access to volumes).

The CCU is stalled and an event raised to indicate the problem. Host loss of access to volumes is prevented. Optional: Node 2 could be rolled back to a previous code level.

The host will perform the same assessment on node 1. If any hosts are assessed as not having good connectivity to Node 1, Node 2 will prompt those hosts to re-perform discovery.

From the above description, it will be understood that there is proposed a method to determine that a host is well connected to a node in a storage controller, e.g. the host has logins from all of its wwpns, through multiple ports on the storage controller, and has issued a Report LUNS command and has issued Inquiries to every volume mapped to that host.

The proposed method(s) may allow a node to immediately upgrade (without further time delay) if every host is well connected to its partner node. Further, lack of any host activity on a node (e.g. immediately after upgrade of a node) may be used to prompt re-discovery of volumes on that node (e.g. by issuing unit attentions on a partner node).

Proposed embodiment may be used to drive rediscovery of paths to volumes on a node in situations other than upgrade. For instance, if a host has lost paths to volumes on a node during normal operations, periodic or scheduled checking of any host activity on each node could use this mechanism to drive rediscovery of paths to volumes on that node. This could allow redundant connectivity to be restored and could be used to highlight potential connectivity problems to users.

Embodiments may enable a CCU process to succeed or to be paused or rolled back without hosts losing access to volumes. Embodiments may thus provide the following benefits:

reduction of application downtime and the associated administrative costs;

avoidance of a need for a customer to contact technical support in the event of successful rediscovery;

reduction in cost to customer to engage applications/server/storage teams to identify and diagnose the source of an issue;

reduction in cost to supplier in investigating loss of access;

avoidance of damage to supplier's reputation;

avoidance of loss of confidence in a CCU process and product.

Additionally, the process of significantly reducing the time taken to complete a CCU process may provide the following benefits:

reduction in customers maintenance window during upgrade;

faster CCU testing,

Accordingly, embodiments may facilitate improved speed and system performance in CCU of nodes of a multi-node storage system. This may reduce a downtime associated with updating/upgrading. Also, the reduction of downtime may improve user/customer service (e.g., better user experience, reduced cost(s), etc.).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It should now be understood by those of skill in the art, in embodiments of the present invention, the proposed concepts provide numerous advantages over conventional CCU approaches. These advantages include, but are not limited to, reduction of application downtime during CCU.

In still further advantages to a technical problem, the systems and processes described herein provide a computer-implemented method for efficient schema generation. In this case, a computer infrastructure, such as the computer system shown in FIGS. 1 and 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 2, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for concurrent code upgrade, CCU, of nodes of a multi-node storage system to upgrade the nodes from a current software version to a target software version, the method comprising:
   installing the target software version on a first node of a storage appliance;
   restarting the first node of the storage appliance while also running the current software version on other nodes of the storage system;
   subsequent to said installing the target software version and said restarting of the first node, determining if all hosts of the storage system have discovered paths to volumes on the first node;
   responsive to determining that all hosts of the storage system have discovered paths to volumes on the first node, permitting the CCU of the nodes to continue to upgrade one of the other nodes of the storage system from the current software version to the target software version; and
   responsive to determining that not all hosts of the storage system have discovered paths to volumes on the first node: preventing the CCU of the nodes from continuing.

2. The method of claim 1, further comprising:
   responsive to determining that not all hosts of the storage system have discovered paths to volumes on the first node, prompting hosts of the storage system to re-perform discovery of paths to volumes on the first node.

3. The method of claim 2, wherein prompting hosts of the storage system to re-perform discovery of paths to volumes on the first node comprises:
   controlling a second node of the storage system to prompt hosts of the storage system to re-perform discovery of paths to volumes on the first node, wherein the second node is one of other nodes of the storage system.

4. The method of claim 2, wherein prompting comprises raising a unit attention for the hosts, and optionally wherein the unit attention comprises an Asymmetric Access State Changed or a LUN Inventory Changed unit attention.

5. The method of claim 2, further comprising:
   subsequent to said prompting hosts of the storage system to re-perform discovery of paths to volumes on the first node;
   determining if all hosts of the storage system have discovered paths to volumes on the first node;
   responsive to determining that all hosts of the storage system have discovered paths to volumes on the first node, permitting the CCU of the nodes to continue to upgrade one of the other nodes of the storage system from the current software version to the target software version; and
   responsive to determining that not all hosts of the storage system have discovered paths to volumes on the first node: stalling the CCU and raising an event to indicate a problem with the CCU.

6. The method of claim 5, further comprising:
   responsive to stalling the CCU, uninstalling the target software version on the first node of the storage appliance to revert the first node back to the current software version.

7. The method of claim 1, wherein determining if all hosts of the storage system have discovered paths to volumes on the first node comprises:
   checking for a predetermined sequence of discovery commands to determine if a host has discovered paths to volumes on the first node.

8. The method of claim 1, wherein permitting the CCU of the nodes to continue to upgrade one of the other nodes of the storage system from the current software version to the target software version comprises:
   installing the target software version on a second node of the storage system; and
   restarting the second node of the storage appliance while also running the current software version on other nodes of the storage system.

9. The method of claim 1, wherein the storage system provides virtualized storage to a plurality of hosts, and wherein the storage system virtualizes storage of a plurality of data storage systems.

10. A system comprising:
   one or more processors; and
   a memory comprising code stored thereon that, when executed, performs a method for concurrent code upgrade, CCU, of nodes of a multi-node storage system to upgrade the nodes from a current software version to a target software version, the method comprising:
   installing the target software version on a first node of a storage appliance;
   restarting the first node of the storage appliance while also running the current software version on other nodes of the storage system;
   subsequent to said installing the target software version and said restarting of the first node, determining if all hosts of the storage system have discovered paths to volumes on the first node;
   responsive to determining that all hosts of the storage system have discovered paths to volumes on the first node, permitting the CCU of the nodes to continue to upgrade one of the other nodes of the storage system from the current software version to the target software version; and
   responsive to determining that not all hosts of the storage system have discovered paths to volumes on the first node: preventing the CCU of the nodes from continuing.

11. The system of claim 10, wherein the method further comprises:
   responsive to determining that not all hosts of the storage system have discovered paths to volumes on the first node, prompting hosts of the storage system to re-perform discovery of paths to volumes on the first node.

12. The system of claim 11, wherein prompting hosts of the storage system to re-perform discovery of paths to volumes on the first node comprises:
   controlling a second node of the storage system to prompt hosts of the storage system to re-perform discovery of paths to volumes on the first node, wherein the second node is one of other nodes of the storage system.

13. The system of claim 10, wherein the method further comprises:
   subsequent to said prompting hosts of the storage system to re-perform discovery of paths to volumes on the first node:
      determining if all hosts of the storage system have discovered paths to volumes on the first node;
      responsive to determining that all hosts of the storage system have discovered paths to volumes on the first node, permitting the CCU of the nodes to continue to upgrade one of the other nodes of the storage system from the current software version to the target software version; and
      responsive to determining that not all hosts of the storage system have discovered paths to volumes on the first node: stalling the CCU and raising an event to indicate a problem with the CCU.

14. The system of claim 13, wherein the method further comprises:
   responsive to stalling the CCU, uninstalling the target software version on a first node of the storage appliance to revert the first node back to the current software version.

15. The system of claim 10, wherein permitting the CCU of the nodes to continue to upgrade one of the other nodes of the storage system from the current software version to the target software version comprises:
   installing the target software version on a second node of the storage system; and
   restarting the second node of the storage appliance while also running the current software version on other nodes of the storage system.

16. The system of claim 10, wherein the storage system provides virtualized storage to a plurality of hosts, and wherein the storage system virtualizes storage of a plurality of data storage systems.

17. A non-transitory computer readable medium comprising code stored thereon that, when executed, performs a method for concurrent code upgrade, CCU, of nodes of a multi-node storage system to upgrade the nodes from a current software version to a target software version, the method comprising:
   installing the target software version on a first node of the storage appliance;
   restarting the first node of the storage appliance while also running the current software version on other nodes of the storage system;
   subsequent to said installing the target software version and said restarting of the first node, determining if all hosts of the storage system have discovered paths to volumes on the first node;
   responsive to determining that all hosts of the storage system have discovered paths to volumes on the first node, permitting the CCU of the nodes to continue to upgrade one of the other nodes of the storage system from the current software version to the target software version; and
   responsive to determining that not all hosts of the storage system have discovered paths to volumes on the first node: preventing the CCU of the nodes from continuing.

18. The non-transitory computer readable medium of claim 17, wherein the storage system provides virtualized storage to a plurality of hosts, and wherein the storage system virtualizes storage of a plurality of data storage systems.

* * * * *